(12) United States Patent
Yazdani

(10) Patent No.: US 9,141,800 B2
(45) Date of Patent: Sep. 22, 2015

(54) METHOD AND APPARATUS FOR DETECTING INTRUSIONS IN A COMPUTER SYSTEM

(75) Inventor: Reza Yazdani, Los Altos, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 404 days.

(21) Appl. No.: 13/332,220

(22) Filed: Dec. 20, 2011

(65) Prior Publication Data

US 2013/0160121 A1   Jun. 20, 2013

(51) Int. Cl.
*G06F 21/54*   (2013.01)
*G06F 21/56*   (2013.01)

(52) U.S. Cl.
CPC ............. *G06F 21/566* (2013.01); *G06F 21/54* (2013.01)

(58) Field of Classification Search
CPC ..................................................... G06F 21/566
See application file for complete search history.

(56) References Cited

U.S. PATENT DOCUMENTS

2003/0188231 A1* 10/2003 Cronce ........................ 714/52
2011/0202996 A1*  8/2011 Monsifrot et al. ............. 726/22

* cited by examiner

*Primary Examiner* — Gilberto Barron, Jr.
*Assistant Examiner* — Simon Kanaan

(57) ABSTRACT

The present invention provides a method and apparatus for detecting intrusions in a processor-based system. One embodiment of the method includes calculating a first checksum from first bits representative of instructions in a block of a program concurrently with executing the instructions. This embodiment of the method also includes issuing a security exception in response to determining that the first checksum differs from a second checksum calculated prior to execution of the block using second bits representative of instructions in the block when the second checksum is calculated.

25 Claims, 6 Drawing Sheets

METHOD AND APPARATUS FOR DETECTING INTRUSIONS IN A COMPUTER SYSTEM

BACKGROUND

The subject matter of the present application relates generally to processor-based systems, and, more particularly, to detecting intrusions in a processor-based system.

Virtually all modern processor-based systems from smart phones to personal computers to mainframes are physically, electronically, and/or communicatively interconnected using networks such as the Internet, intranets, and the like. Although interconnecting computers provides enormous advantages, e.g., by facilitating communication between the computers, networked computers are also vulnerable to intruders. Intruder code may be defined as a software program that executes without authorization and/or illegally on the hardware of the processor-based system. Intruders can include computer viruses, computer worms, Trojan horses, spyware, adware, malware, and the like. A computer virus is a computer program that can replicate itself and spread from one computer to another. A worm is a computer program that can exploit security vulnerabilities to spread itself automatically to other computers through networks, while a Trojan horse is a program that appears harmless but hides malicious functions. Worms and Trojan horses, like viruses, may harm a computer system's data or performance. Some viruses and other malware have symptoms that can be observed or detected by the computer user, but many are surreptitious and may do nothing obvious while they are on the computer system. Some viruses do nothing beyond reproducing themselves.

Viruses, worms, and other intruders can be detected after they have infected a computer, e.g., using antivirus software. Most modern antivirus programs try to find virus-patterns inside ordinary programs by scanning them for virus signatures. A signature is a characteristic byte-pattern that is part of a virus or family of viruses. If a virus scanner finds a known virus pattern in a file, it notifies the user that the file is infected. More sophisticated viruses can avoid detection by modifying their structure to conceal their characteristic byte patterns. In some cases the virus can modify portions of itself on each infection so that no byte pattern is repeated in different instances of the virus and no characteristic pattern is produced. For example, one type of virus uses a different key to encrypt different instances of the virus so that the only part of the virus that remains constant is a decrypting module used to decode the virus when it infects a file or system. For another example, polymorphic code may be used to create a polymorphic virus that infects files with an encrypted copy of itself, which is decoded by a decryption module. However, the decryption module in a polymorphic virus is also modified on each infection. A well-written polymorphic virus therefore has no parts that remain identical between infections, making it very difficult to detect the polymorphic virus using virus signatures.

A detected virus or other intruder can be eliminated from the computer system, e.g., by removing the intruder code and by looking for a match between the intruder code and segments of the existing object codes on the computer system and/or other computer systems. Matching intruder code segments can then be removed. However, a posteriori removal of intruder code has a number of disadvantages. For example, damage done by the intruder code such as erasing or modifying files may not be reparable, particularly when the damage is extensive. For another example, the intruder code may be able to replicate itself and infect other systems before it is detected by the antivirus software. The elimination process only removes the intruder from the current system and any other systems that are specifically searched by the antivirus software, but allows the intruder to live on in other systems that are not searched by the antivirus software.

SUMMARY OF EMBODIMENTS

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a method is provided for detecting intrusions in a processor-based system. One embodiment of the method includes calculating a first checksum from bits representative of instructions in a block of a program concurrently with executing the instructions. This embodiment of the method also includes issuing a security exception in response to determining that the first checksum differs from a second checksum calculated prior to execution of the block using bits representative of instructions in the block. Embodiments of apparatuses for performing embodiments of the method are also provided. Embodiments of a computer readable storage medium encoded with instructions that, when executed by a processor-based system, cause the processor-based system to perform embodiments of the method are also provided.

In another embodiment, a method is provided for creating data that can be used to detect intrusions in a processor-based system. One embodiment of the method includes generating a table that includes entries that are indexed by addresses associated with blocks of a program. Entries of the table include a checksum calculated using bits representative of instructions in the block so that values of the entries in the table can be compared with checksums generated by a processor-based system concurrently with the processor-based system executing the corresponding block of the program. Embodiments of apparatuses for performing embodiments of the method are also provided. Embodiments of a computer readable storage medium encoded with instructions that, when executed by a processor-based system, cause the processor-based system to perform embodiments of the method are also provided.

In another embodiment, an apparatus is provided for detecting intrusions in a processor-based system. One embodiment of the apparatus includes one or more processors configured to calculate a first checksum from bits representative of instructions in a block of a program concurrently with executing the instructions. This embodiment of the apparatus also includes a first register for storing the first checksum and a second register for storing a value of a second checksum calculated prior to execution of the block using bits representative of instructions in the block. The one or more processors are configured to issue a security exception in response to determining that the first checksum is different than the second checksum.

BRIEF DESCRIPTION OF THE DRAWINGS

The disclosed subject matter may be understood by reference to the following description taken in conjunction with the accompanying drawings, in which like reference numerals identify like elements, and in which.

Figure 1:
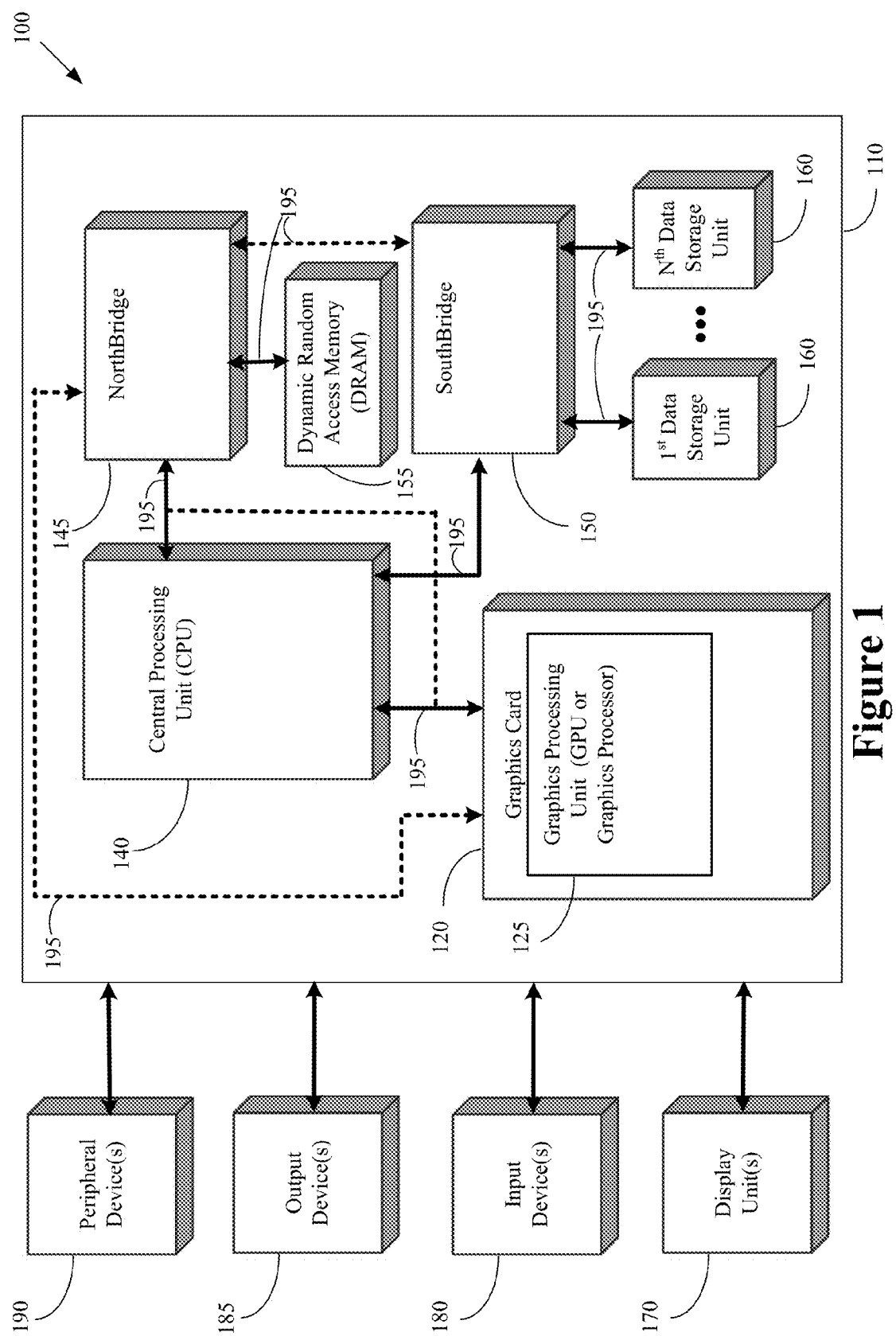
FIG. 1 conceptually illustrates a first exemplary embodiment of a computer system.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Generally, the present application describes embodiments of processor-based systems that can be configured to detect intruders. Embodiments of the techniques described herein may use a combination of hardware features and/or software features to detect intruders concurrently with executing a potentially infected program. In one embodiment, the processor-based system can be configured to compute checksums and/or hashes using bits that represent the instructions in one or more basic blocks of a program. Each basic block includes the instructions beginning at a label and ending with a branch instruction. The checksums/hashes may also be formed using bits that represent the location of the basic block in the program, e.g. the address of the label that begins the basic block and/or the location of the instruction relative to the label. The checksums/hashes may be stored in a table that is indexed by a code address such as a program counter or a branch target. When the program is executed, parallel or concurrent processes can calculate running values of the checksums/hashes as instructions in the basic blocks are executed. When a branch is reached, the accumulated value of the checksum/hash is compared to the previously calculated value of the checksum/hash. As long as the two values match, the program executes normally. If a mismatch is detected, a security exception can be issued and the detected intruder code eliminated or otherwise addressed to mitigate its effects.

FIG. 1 conceptually illustrates a first exemplary embodiment of a computer system 100. In various embodiments, the computer system 100 may be a personal computer, a laptop computer, a handheld computer, a netbook computer, a smart phone, a tablet computer, a mobile device, a telephone, a personal data assistant (PDA), a server, a mainframe, a work terminal, or the like. The computer system 100 includes a main structure 110 which may be a computer motherboard, system-on-a-chip, circuit board or printed circuit board, a desktop computer enclosure and/or tower, a laptop computer base, a server enclosure, part of a mobile device or smart phone, personal data assistant (PDA), or the like. In one embodiment, the computer system 100 runs an operating system such as Linux, Unix, Windows, Mac OS, OS X, Android, iOS, or the like.

In the illustrated embodiment, the main structure 110 includes a graphics card 120. For example, the graphics card 120 may be an AMD Radeon™ graphics card from Advanced Micro Devices ("AMD"). The graphics card 120 may, in different embodiments, be connected on a Peripheral Component Interconnect (PCI) Bus (not shown), PCI-Express Bus (not shown), an Accelerated Graphics Port (AGP) Bus (also not shown), or other electronic and/or communicative connection. In one embodiment, the graphics card 120 may contain a graphics processing unit (GPU) 125 used in processing graphics data. In various embodiments, the graphics card 120 may be referred to as a circuit board or a printed circuit board or a daughter card or the like. In one embodiment, the GPU 125 may implement one or more shaders. Shaders are programs or algorithms that can be used to define and/or describe the traits, characteristics, and/or properties of either a vertex or a pixel. For example, vertex shaders may be used to define or describe the traits (position, texture coordinates, colors, etc.) of a vertex, while pixel shaders may be used to define or describe the traits (color, z-depth and alpha value) of a pixel.

The computer system 100 shown in FIG. 1 also includes a central processing unit (CPU) 140, which is electronically and/or communicatively coupled to a northbridge 145. The CPU 140 and northbridge 145 may be housed on the motherboard (not shown) or some other structure of the computer system 100. It is contemplated that in certain embodiments, the graphics card 120 may be coupled to the CPU 140 via the northbridge 145 or some other electronic and/or communicative connection. For example, CPU 140, northbridge 145, and/or GPU 125 may be included in a single package or as part of a single die or "chip." In certain embodiments, the northbridge 145 may be coupled to a system RAM (or DRAM) 155 and in other embodiments the system RAM 155 may be coupled directly to the CPU 140. The system RAM 155 may be of any RAM type known in the art; the type of RAM 155 does not limit the embodiments of the present invention. In one embodiment, the northbridge 145 may be connected to a southbridge 150. In other embodiments, the northbridge 145 and southbridge 150 may be on the same chip in the computer system 100, or the northbridge 145 and southbridge 150 may be on different chips. In various embodiments, the southbridge 150 may be connected to one or more data storage units 160. The data storage units 160 may be hard drives, solid state drives, magnetic tape, or any other writable and/or readable media used for storing data. In various embodiments, the central processing unit 140, northbridge 145, southbridge 150, graphics processing unit 125, and/or DRAM 155 may be a computer chip or a silicon-based computer chip, or may be part of a computer chip or a silicon-based computer chip. In one or more embodiments, the various components of the computer system 100 may be operatively, communicatively, electrically and/or physically connected or linked with a bus 195 or more than one bus 195.

The computer system 100 may be connected to one or more display units 170, input devices 180, output devices 185, and/or peripheral devices 190. In various alternative embodiments, these elements may be internal or external to the computer system 100 and may be wired or wirelessly connected. The display units 170 may be internal or external monitors, television screens, handheld device displays, and the like. The input devices 180 may be any one of a keyboard, mouse, track-ball, stylus, mouse pad, mouse button, joystick, scanner or the like. The output devices 185 may be any one of a monitor, printer, plotter, copier, or other output device. The peripheral devices 190 may be any other device that can be coupled to a computer. Exemplary peripheral devices 190 may include a CD/DVD drive capable of reading and/or writing to physical digital media, a USB device, Zip Drive, external floppy drive, external hard drive, phone and/or broadband modem, router/gateway, access point and/or the like.

The computer system 100 may become infected with intruder code such as viruses, worms, Trojan horses, spyware, adware, malware, and the like, which may be referred to generally as intruders and which operate or execute on the computer system 100 without authorization and/or illegally. An intruder may execute malicious code as part of a legitimate code execution process or as an independent code execution process, e.g., by causing a legitimate code execution process to branch to a legitimate code execution process. In one embodiment, the intruder appends its code to the legitimate executable code, inserts a portion of its code into the legitimate executable, and/or changes some data to cause the legitimate program to branch to the malicious code. Code changes such as code changes caused by an intruder can be detected by comparing and/or matching the code at execution time with the original build of the code to make sure that the original build has not been altered following the original build, e.g. before or during the execution. Matching each structure in the original build of the executable to the code that is run at execution time may be prohibitively time consuming with existing methodologies.

At least in part to address these drawbacks in the conventional practice, embodiments of the computer system 100 may be configured to detect intruders by comparing basic block checksums for the original code and the code that is being executed by the computer system 100. In one embodiment, the computer system 100 determines whether the executed code leading to a branch instruction has been altered and whether the target of the branch is legitimate. For example, the computer system 100 may verify that no branch target has been altered during or before execution to cause the code to branch to code that did not exist at build time. For another example, the computer system 100 can verify that the instruction sequence of the executed code leading to a branch (including the branch instruction) matches the code sequence of the original binary. Violation of any of these constraints is indicative of an intrusion and causes a security exception. In one embodiment, the computer system 100 may detect the security breach and raise a security exception as soon as a violation is detected. As will be discussed herein, no code change to the executable is necessary and there is substantially no performance penalty to continuously and/or concurrently monitoring the executing process for intruders at run time. No special build is required. In one embodiment, the information used to detect intruders can be added to the data section of the code after the build.

Figure 2:
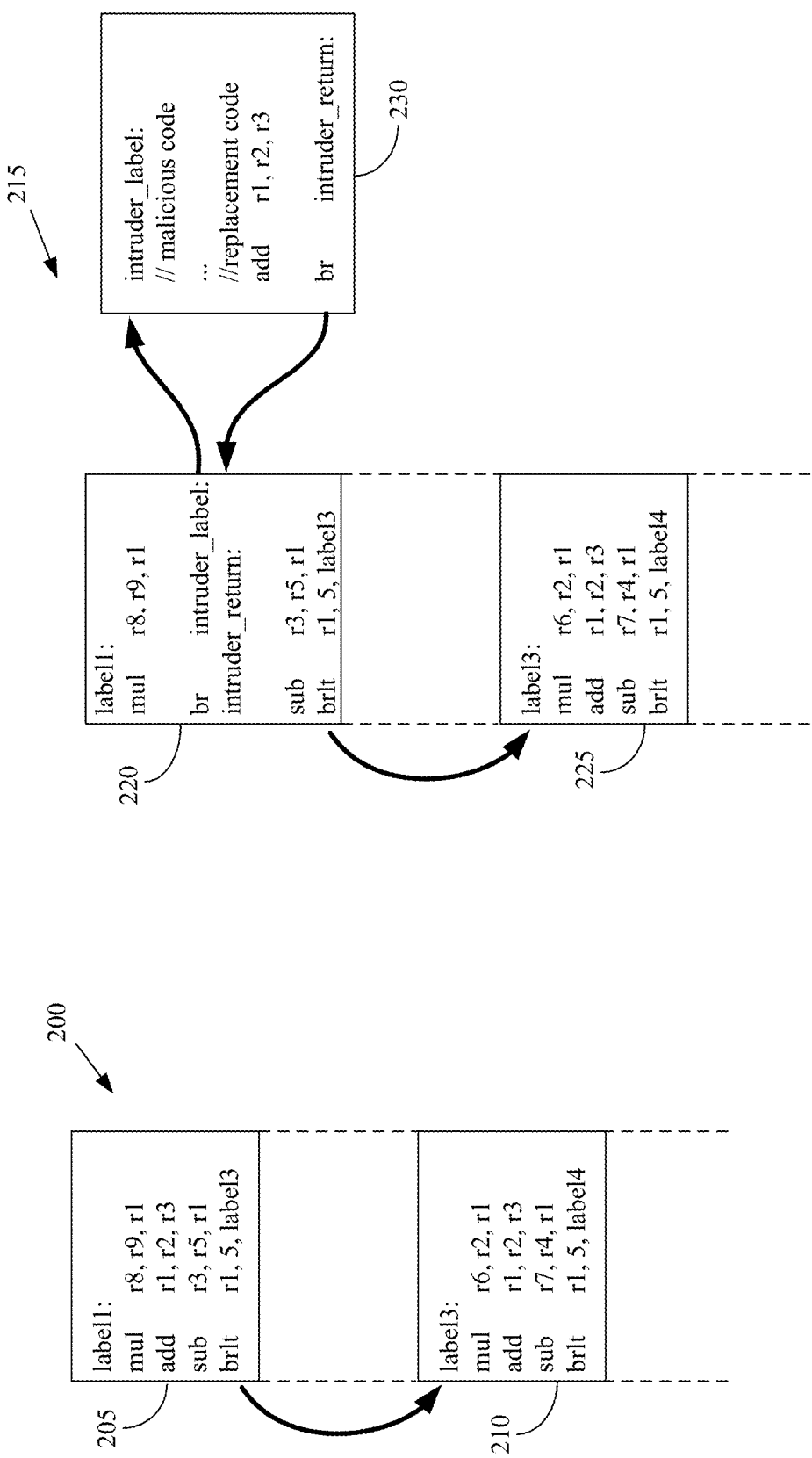
FIG. 2A conceptually illustrates one exemplary embodiment of a program.
FIG. 2B conceptually illustrates one exemplary embodiment of a program that has been infected by an intruder FIG. 3 conceptually illustrates one exemplary embodiment of a method for detecting intruder code on a processor-based system.

FIG. 2A conceptually illustrates one exemplary embodiment of a program 200. The program 200 may be considered a representation of the original build of a program and/or an uninfected copy of the original program. In the illustrated embodiment, the program 200 includes a plurality of basic blocks 205, 210. As used herein, the term basic block (BB) refers to a sequence of instructions that are executed as a block beginning at an entry point and continuing to an exit point. The number of instructions in a basic block is determined by the location of the entry and exit points. In some embodiments, a basic block may include more than one entry point associated with each exit point. Each of the basic blocks 205, 200 shown in FIG. 2A begins at an entry point that is indicated by a label (e.g., label1, label3, etc.) and continues to an exit point indicated by a branch instruction, e.g., the brlt instruction that causes the program flow to branch to a particular label when the value of the register is less than a parameter value. The number of instructions in the basic block 205 is 4. For example, during normal operation the program executes instructions in the basic block 205 until reaching the branch instruction, brlt r1, 5, label3. If the value of the register r1 is less than 5, the program branches to label3, which is the beginning of the basic block 210. In the illustrated embodiment, return and call instructions are considered branches and the fall through of a branch is considered a label.

FIG. 2B conceptually illustrates one exemplary embodiment of a program 215 that has been infected by an intruder. The program 215 includes a plurality of basic blocks 220, 225. In the illustrated embodiment, the program 215 is a representation of an infected version of the original build of the program 200 shown in FIG. 2A. The basic block 220 therefore represents an infected version of the basic block 205 and the basic block 225 is an uninfected version of the basic block 210. As shown in FIG. 2B, an intruder has attached its code to the program 215 by replacing an instruction (add r1,r2,r3) in the basic block 205 with a branch to an illegal and/or unauthorized code block 230. The code block 230 includes malicious code that can be used to damage the computer system running the program 215 and/or to replicate the intruder in one or more other computer systems. The intruder incorporates a copy of the instruction (add r1,r2,r3) from the original program 215 into the code block 230 before the branch instruction that returns the program flow back to the original place in the basic block 220. After performing its malicious tasks, intruder replaces the branch it inserted with the original code and branches back to the location that it started in the user code so that the execution of the original program may resume. The original instructions from the basic block 220 may therefore be performed in the correct order so that there is no noticeable change in the behavior of the altered program 215 relative to the program 200. After the intrusion, the infected program 215 therefore continues its execution without noticing the intrusion and problems it may have caused.

In one alternative embodiment, an intruder may access a call stack and change the return address of the current function saved on the stack to the address of the beginning of the malicious code. When the running function (e.g., the program 200) executes the return statement, it branches (returns) to the intruder code instead of returning to its caller. The original return address can be saved and used after the execution of the illegal code to return to the original caller. This kind of intrusion is usually done through a stack overflow which replaces the return address to the address of the malicious code.

Figure 3:
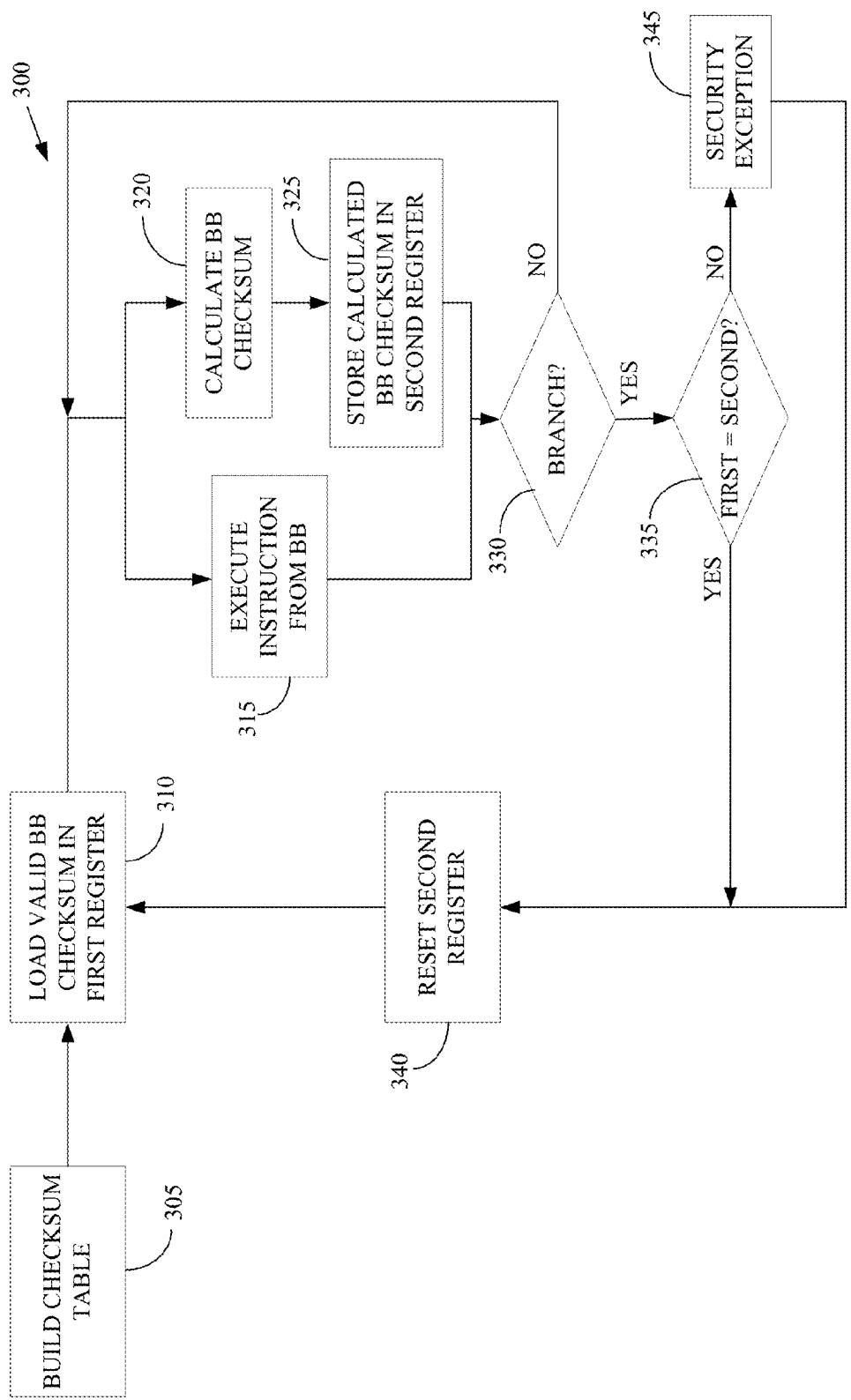

FIG. 3 conceptually illustrates one exemplary embodiment of a method 300 for detecting intruder code on a processor-based system. In the illustrated embodiment, a checksum table is built (at 305) using bits representative of an original build of an executable file or any other version of the executable file that is known or assumed to be uninfected by intruder code. For example, as discussed herein, the checksum table may be built (at 305) by calculating checksums using a function that takes bits representative of each instruction in basic blocks in the program as arguments and returns a checksum or hash function, e.g., by applying an exclusive-OR and/or other operation to combinations of the bits. In some embodiments, bits representative of a location of each instruction within the block may also be used as arguments to the function so that they are incorporated into the checksum value. Entries in the table can be indexed by information indicating a location of the basic block in the program such as an address of the label that begins the basic block. The table may be sparse or packed in different embodiments.

In operation, the processor-based system executes instructions in basic blocks of the program and concurrently monitors the executed instructions to detect intruders. A valid basic block checksum may therefore be loaded (at 310) from the checksum table into a dedicated register. The processor-based system may also begin to execute (at 315) instructions in the basic block. Concurrently and/or in parallel with executing (at 315) the instructions, the processor-based system may also calculate (at 320) a running value of the basic block checksum using the same function that was used to construct the table by applying this function to bits representative of the actual instructions that are being executed (at 315). The running value of the basic block checksum can be stored (at 325) in a second register as it is calculated, updated, and/or accumulated for each instruction in the basic block.

The processor-based system may check (at 330) each instruction to see whether or not it is a branch. If the current instruction is not a branch, the processor-based system continues to execute (at 315) the next instruction and concurrently calculate (at 320) and store (at 325) the running value of the checksum. When the program flow reaches a branch, the processor-based system compares (at 335) the value of the basic block checksum in the dedicated register to the value of the basic block checksum that was generated concurrently with execution of the instructions in the basic block. If the two values are equal (at 335), the processor-based system concludes that the basic block has not been modified by code such as an intruder code. The second register containing the running value of the checksum can then be reset (at 340), e.g., to zero, and a valid basic block checksum for the next basic block to be executed following the branch can be loaded (at 310) into the dedicated first register. If the two values are different (at 335), the processor-based system can issue (at 350) a security exception. In different embodiments, the system may stop/hang or continue to operate following the security exception (at 345).

Figure 4:
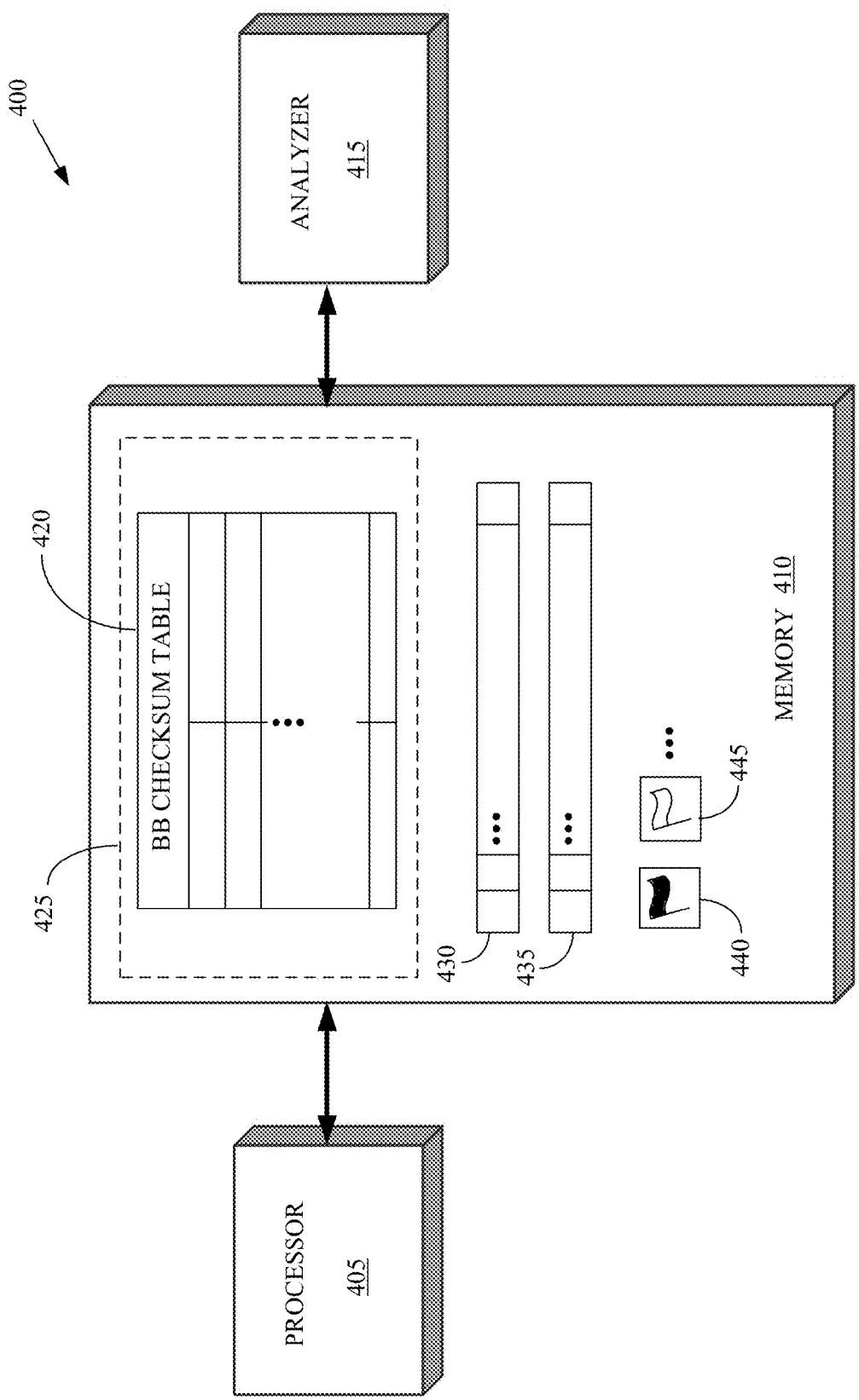
FIG. 4 conceptually illustrates a second exemplary embodiment of a processor-based system.

FIG. 4 conceptually illustrates a second exemplary embodiment of a processor-based system 400. In the illustrated embodiment, the processor-based system 400 includes one or more processors 405, one or more memory elements 410, and analyzer functionality 415 that can be configured to detect intrusions in the processor-based system 400. Although the processors 405 and the analyzer 415 are depicted as separate entities, persons of ordinary skill in the art having benefit of the present disclosure should appreciate that alternative embodiments of the processor-based system 400 may implement the processors 405 and the analyzer 415 using the same or different hardware. For example, the processor 405 may run software and/or firmware that is used to implement the analyzer 415. Alternatively, other processors, co-processors, processor cores, and the like may be used to implement the analyzer 415. Furthermore, the memory 410 may be implemented as a single block of memory or multiple blocks of memory, caches, registers, and the like.

The memory 410 includes a basic block checksum table 420 that is used to store checksums or hashes for the basic blocks of an original and/or uninfected build of one or more programs that may be executed by the processor 405. In the illustrated embodiment, the checksum table 420 is stored in a secure region 425 of the memory 410. Security of the region 425 may be provided using encryption, authorization/passwords, security levels, privilege rings, and other well-known techniques. The checksum table 420 may be a pre-built sparse table that is indexed by a code address such as a program counter or a branch target associated with the corresponding basic blocks. Alternatively, the table 420 may be a packed table that includes entries for each structure such as a dummy entry of "−1" for entries indexed by the addresses of the instructions and an entry (indexed by the address of the label of the basic block) that indicates the value of the checksum for the basic block.

The memory 410 also includes registers 430, 435 for storing basic block checksum values. In the illustrated embodiment, the register 430 is used to store values of the checksums that are computed using the bits of the executable file prior to executing the program. The register 430 holds the pre computed checksum value to be matched against run-time-computed basic block checksum after execution of the next branch. The value of the register 430 is updated from the table 420 after each branch execution. The loaded value of the checksum can be checked against the run-time-computed basic block checksum after the next branch. The register 430 may only be accessed by privileged code. For example, the operating system may save and/or restore the register 430 as part of the program working set. The register 435 is used to store the running values of the checksums that are computed concurrently with executing the file using the bits of the instructions that are actually executed by the processor 405. The register 435 may only be accessed by privileged instructions. For example, the operating system may save and/or restore the register 435 as part of the program working set. The working set of information $W(t,\tau)$ of a process at time t may be defined as the collection of information referenced by the process during the process time interval $(t-\tau,t)$.

One or more hardware flags may also be included in the processor-based system 400. In the illustrated embodiment, a hardware flag 440 is set (as indicated by the black flag) if run-time security checking is to be performed, e.g. by the analyzer 415. For example, the operating system may set the hardware flag 440 when the table 420 is pre-built for software that is executing or is going to be executed by the processor 405. A security exception flag 445 may be raised if the security violation is detected, e.g., if the analyzer 415 detects intruder code. The security exception flag 445 is not set in the illustrated embodiment, as indicated by the white flag. The security exception flag 445 may also be a hardware flag.

Branch execution by the processor 405 and/or the analyzer 415 may be configured to perform intruder detection tasks concurrently with and/or in parallel to the standard operations of the processor-based system 400. In the illustrated embodiment, the value stored in the register 435 is compared against the value stored in the register 430. A security exception may be raised by setting the security exception flag 445 in response to determining that the values in the registers 430, 435 do not match. Following each branch, the value of the register 430 may be updated to its next value. For example, the program counter (pc) of the next instruction to be executed after the branch (branch_target_address) may be used as an index to locate the checksum value for the basic block indicated by the branch target address. The checksum value can be loaded from the table 420 into the register 430. The register 435 may be initialized to zero or to a value that indicates the location of the basic block, such as the branch_target_address. Initializing the register 435 to the branch target address makes the checksum sensitive to the location of the instruction.

Figure 5:
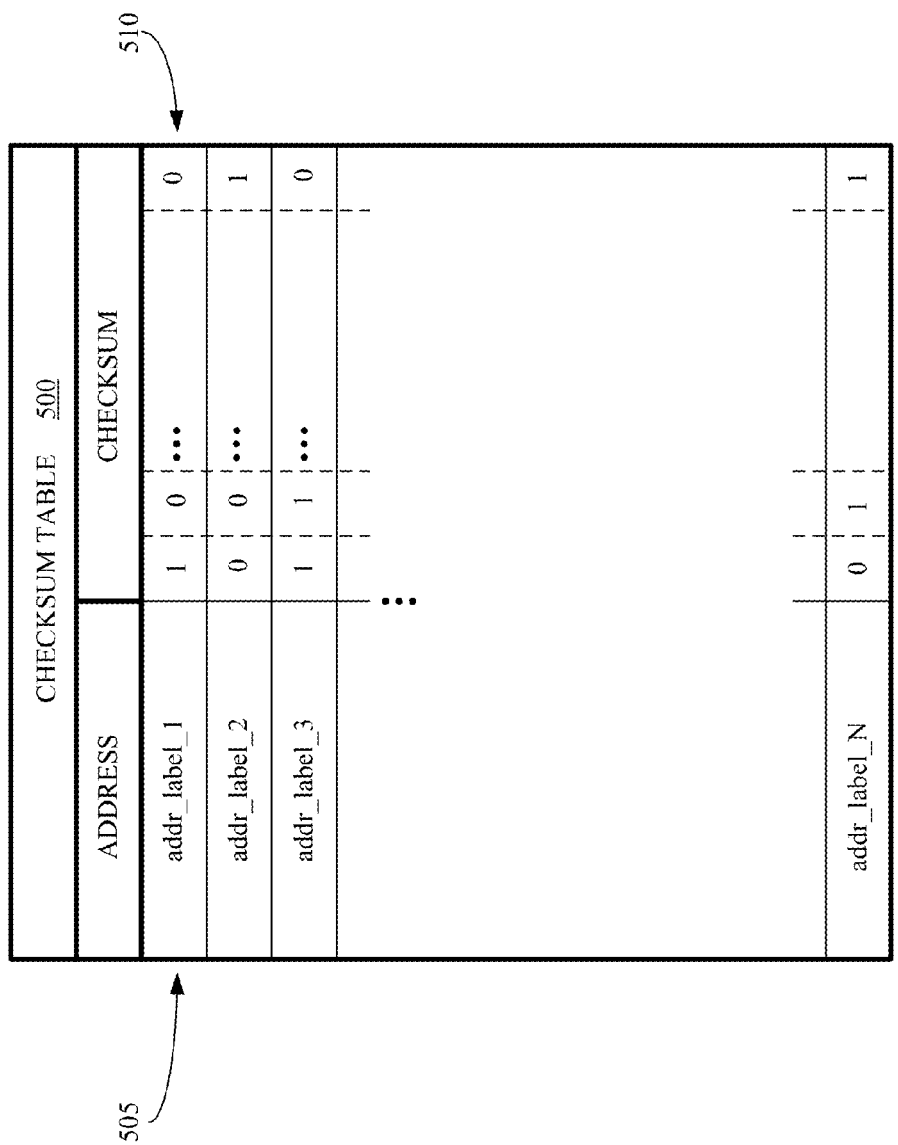
FIG. 5 conceptually illustrates one exemplary embodiment of a checksum table.

FIG. 5 conceptually illustrates one exemplary embodiment of a checksum table 500. In one embodiment, the checksum table 500 may be a sparse table built for each executable by a linker or auxiliary software. The checksum table 500 is indexed by program addresses 505 and each entry in the checksum table 500 includes bits representing the corresponding checksum value 510. The checksum values for locations that are not defined in the table 500 may be assumed to have a value of –1. For example, the checksum table 500 may include a list of address-value pairs sorted by address 505. The addresses 505 in the illustrated embodiment are the addresses of labels for basic blocks, e.g., the addresses addr_label_1, ..., addr_label_N, where N is the number of basic blocks in the program or executable. The checksum value 510 at table 500 is the value of the checksum that is computed starting from the label and ending at the next branch. Alternatively, the checksum table 500 may not be sparse and an entry may be included in the table 500 for each instruction. In this alternative embodiment, each basic block has one "interesting" entry in the checksum table 500 that includes the checksum value for the basic block. The remaining "uninteresting" entries for the basic block may be initialized to a dummy value such as –1. The size of this alternative embodiment of the table 500 can be reduced by setting offsets to the address modulo the smallest instruction size. For example if the smallest instruction is 4 bytes, the offsets can be word addresses. In different embodiments, the table 500 may be implemented using different structures in memory and different methods may be used to access the different implementations of the table 500. For example, some embodiments of the table 500 may be implemented as a contiguous structure in the memory. However, other embodiments of the table 500 may not be implemented as a contiguous structure in memory. The structure of the table 500 may be defined and built by compilers on a function-by-function basis.

Figure 6:
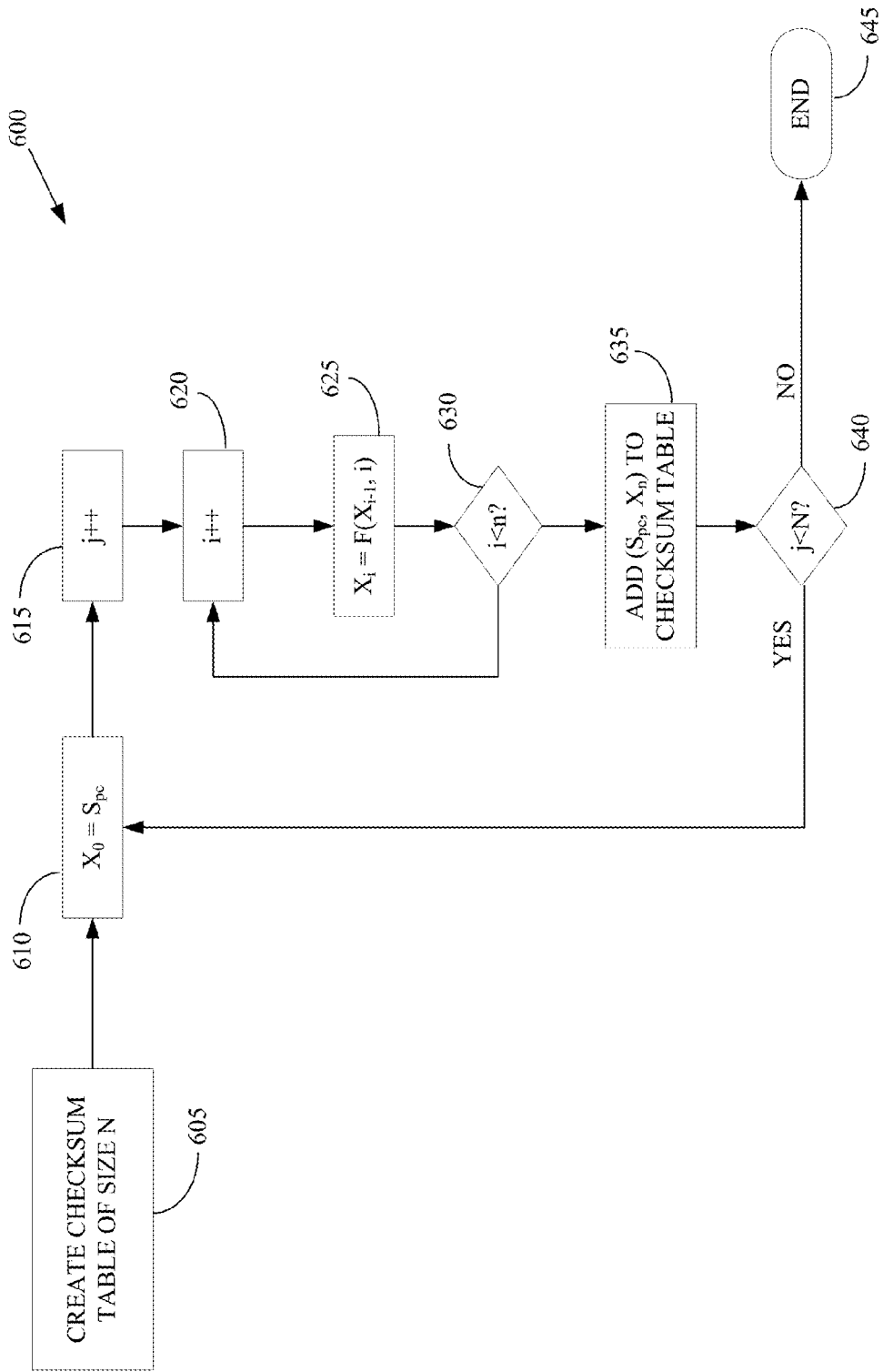
FIG. 6 conceptually illustrates one exemplary embodiment of a method for creating a checksum table, such as the checksum tables shown in FIGS. 4 and 5.

FIG. 6 conceptually illustrates one exemplary embodiment of a method 600 for creating a checksum table, such as the checksum tables 420 and 500 shown in FIGS. 4 and 5, respectively. In the illustrated embodiment, a checksum table is created (at 605). For example, a checksum table can be created (at 605) for a program or executable that is made up of code segments, S, by allocating secure memory for the table. The code segments, S, are defined as the instructions that are located between a label and the first branch following the label. Return and call instructions may be considered branches. The fall through of a branch may be considered a label. In some embodiments, each code segment S may have more than one label (e.g. a code segment S may include multiple labels separated by code that does not include a branch). The program or executable includes N code segments S, each code segment S includes n instructions (n may be different for different code segments), and Spc is the address of the starting label of the code segment S. In some embodiments, N is equal to the number of labels in the program if entries to the functions and branch fall-throughs are counted as labels.

In the illustrated embodiment, the running value of the checksum $X_0$ is initialized (at 610) to $S_{pc}$ to make it sensitive to the position of S with respect to the rest of the executable. The variable j indicates the position of the j-th code segment and the variable j is incremented (at 615). The variable i indicates the position of the i-th instruction in the code segment and the variable is incremented (at 620). In the illustrated embodiment, the checksum value Xn for each code segment is computed (at 625) using a running value $X_i = F(X_{i-1}, i)$ that holds or accumulates the checksum as it is modified based on the bits in each instruction. The function F is a recursive function that computes the running values based on the binary representation of the instruction i, the position of the instruction, and the previous value $X_{i-1}$. In the illustrated embodiment, the function F is designed to preserve the binary representation of the instructions and the ordering of instructions. For example, the function F may be defined as a 32 bit addition of the sum of the 16 bit segments of an instruction binary code, the position of the instruction in S, and the previous value of value $X_{i-1}$. The definition of F may be different in different embodiments and may be changed for security reasons from time to time and/or during the execution of the executable program.

The method 600 continues to accumulate and/or update (at 625) the running value until variable i indicates the end of the basic block has been reached (at 630). The computed value $X_n = F(X_{n-1}, n)$ is the value of X computed after the branch. This value is added (at 635) to the checksum table. For example, an entry may be added (at 635) to the checksum table with an index of $S_{pc}$ and a value of $X_n$. The method 600 then determines (at 640) whether there are additional code segments to process. If so, then the running value is initialized (at 610) to $S_{pc}$ of the next code block and the method 600 proceeds with calculating the next entry for the checksum table. When all of the code segments have been analyzed, the method 600 may end (at 645)

In one embodiment, the method 600 may be implemented using algorithms that are performed by a linker or by a binary analyzer so that the table is built by the linker or by the binary analyzer. To build the checksum table at link time, all S segments are identified so that all of the $X_n$'s for the checksum table may be computed by the linker. Alternatively, to build checksum table from an executable, the control flow graph of the program is built and S segments are identified so that the $X_n$'s may be computed by the binary analyzer for S segments. In the illustrated embodiment, the executable of the operating system indicates the presence of the checksum table for a program by setting a secure flag (such as the secure flight 440 shown in FIG. 4) at run time.

The checksum table can be a static or dynamic structure. In a statically linked program, the checksum table can be built before the program starts. In the case of dynamic linking, the checksum table is initially computed for the existing code and may be modified at run time to include values of $X_n$ for S blocks of newly linked code. The checksum table may also be built for an object that is already linked by building the control flow graph of the program and identifying the blocks that include the code between every branch target and the next branch. Checksums can be computed as described herein and the table can then be built and initialized. In one embodiment, a compiler can build the checksum table for a function by creating a table per function. The checksums may be computed and initialization code can be generated for the label-address and the computed checksums related to the labels. The actual addresses of functions may be filled in by the linker. In one embodiment, small checksum tables for portions of the code or code fragments may be combined to generate the checksum table from the combination of smaller tables. A pointer to the portion of the table for a particular function can be loaded at the call to the function. The pointer may include the address of the checksum table for the called function. The function-table entries may then be accessed using values of indexes that are measured relative to the portion of the table allocated to that function.

Referring back to FIG. 4, software, firmware, and/or hardware including the processor 405, the memory 410, and the analyzer 415 can be configured to detect intruders according to embodiments of the techniques described herein. In one embodiment, before a program starts, the operating system implemented the processor-based system 400 checks for the existence of the basic block checksum table 420 in the secure data section 425 of the memory 410. If the operating system detects the checksum table 420, the operating system may set the secure hardware flag 440 and initialize the register 430 to the appropriate entry in the checksum table 420. The operating system may also initialize the register 435 to zero (or a label address value) before passing the control to the user program.

The processor 405 and/or the analyzer 410 may then monitor operations performed by hardware to attempt to detect intruder code when the secure hardware flag 440 is set. For example, the value R_CS of the register 435 may be calculated using the function R_CS=F(R_CS, i) concurrently and/or in parallel with the instruction execution, where i is the ordinal of the instruction in the current S segment and F may be defined as discussed herein. If the current instruction is a branch, the processor 405 and/or the analyzer 410 may compare values of the registers 430, 435 and raise a security exception if these values do not match. The processor 405 and/or the analyzer 415 may then load the next pre-computed value of the checksum into the register 430 using the address of the branch target as the index into the checksum table. The branch target is the address of the next instruction to execute after the branch. The value of the register 435 may be set to the value of the branch target. In one embodiment, the processor-based system 400 can be further enhanced to turn off security checking computations after a section of code in an instruction cache (not shown) has been executed and has been verified to be bug free. As long as the section of code remains in the instruction cache, it should remain free of intruder code and so it may not be necessary to continue to check for intruders. Many programs spend most of their time in loops and so this enhancement may improve resource management and possibly increase energy saving while decreasing execution time.

Embodiments of the techniques described herein can be used to detect intruder code during execution of programs that include the malicious code. These techniques may therefore allow the intruder code to be detected and eliminated before the malicious code is able to do any significant damage and perhaps before the code is able to replicate itself to other systems. For example, if the intruder code has replaced a valid instruction in a basic block with a branch to a malicious code fragment, the checksum computed for the actual instructions executed by the system may not match the pre-computed checksums for the basic block. The processor-based system may then immediately raise a security exception. Furthermore, if the intruder changed the branch address to branch and execute its code, the new address would not be a valid entry in the checksum table and a security exception would again be raised immediately. For another example, if the return address for a valid branch instruction is changed by the intruder to branch to the malicious code; the new return address would not be a valid entry in the checksum table. The system would therefore raise an exception in response to execution of the branch to the invalid return address.

Relative to existing methodologies, embodiments of the techniques described herein may provide advantages such as substantially immediate detection of software intruders which may interrupt execution of the malicious code, limit the damage, and eliminate the need for an a posteriori detection process such as the pattern matching techniques used in conventional antivirus software. Embodiments of these techniques may be implemented at least partially in system hardware and there is no need to detect the same bug on every system individually. Embodiments of the intruder code detection technologies described herein can detect all intruders including those changing their code or hiding in the system for future attacks. The security procedure can be changed dynamically to elevate level of security.

The performance penalty for embodiments of the intruder detection techniques described herein is almost zero. For example, the monitoring, checking, and/or computation used in the intruder detection techniques may be done concurrently and/or in parallel with the normal execution of the program. Alternatively, portions of the intruder detection techniques may be performed off line. Loading the previously calculated values of the checksum from the checksum table to its register is the only operation with a possible performance penalty. However, this overhead is negligible because this register is loaded in the previous branch and is tested in the current branch and usually there are enough instructions between the current branch and the next branch to cover for the load latency. Moreover, the data may be resident in cache memory. For example, issuing the pre-fetch in response to an instruction cache miss guarantees residence of data in the data cache when it is needed for branches within the instruction cache.

As explained herein, the load that is used to set the register that holds the precomputed value may be performed for every branch in the program. The branch target used as an index should be in the instruction cache because that is the next code segment to be executed. To avoid data cache misses for loads from the checksum table, a pre-fetch of the checksum table entry at the cache-missed-address can be issued whenever the instruction cache is missed. The pre-fetch brings the data into the data cache when the instruction cache gets the instructions to execute. Cache misses for accessing the checksum table may be further reduced if a very fast special data cache CACHE_R_CS is designed and dedicated to hold the pre-computed checksum values of S segments residing in the instruction cache. Embodiments of the data cache CACHE_R_CS may be updated whenever the instruction cache is updated. The value of the register holding the precomputed checksum values can be loaded from CACHE_R_CS if the branch target is in the instruction cache. Otherwise both the instruction cache and the related checksum table entries may be cached concurrently. Alternatively, the data cache can be used to serve the same purpose as CACHE_R_CS by keeping S segments of data related to current instruction cache entries. This data may be updated whenever the instruction cache is updated.

Embodiments of processor-based systems that can perform intruder code detection as described herein (such as the processor system 100) can be fabricated in semiconductor fabrication facilities according to various processor designs. In one embodiment, a processor design can be represented as code stored on a computer readable media. Exemplary codes that may be used to define and/or represent the processor design may include HDL, Verilog, and the like. The code may be written by engineers, synthesized by other processing devices, and used to generate an intermediate representation of the processor design, e.g., netlists, GDSII data and the like. The intermediate representation can be stored on computer readable media and used to configure and control a manufacturing/fabrication process that is performed in a semiconductor fabrication facility. The semiconductor fabrication facility may include processing tools for performing deposition, photolithography, etching, polishing/planarizing, metrology, and other processes that are used to form transistors and other circuitry on semiconductor substrates. The processing tools can be configured and are operated using the intermediate representation, e.g., through the use of mask works generated from GDSII data.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method, comprising:
   calculating a running value of a first checksum from first bits representative of each instruction in a block of a program concurrently with executing the corresponding instruction; and
   issuing a security exception in response to the running value of the first checksum differing from a second checksum calculated prior to execution of the block using second bits representative of instructions in the block.

2. The method of claim 1, wherein calculating the running value of the first checksum comprises calculating the running value of the first checksum by applying a function to first bits representative of each instruction in a block that begins at a label and ends with a branch instruction, and comprising comparing the running value of the first checksum to the second checksum in response to executing the branch instruction.

3. The method of claim 2, wherein calculating the first checksum comprises calculating the first checksum by applying the function to the bits representative of each instruction in the block and bits representative of a location of each instruction within the block.

4. The method of claim 3, wherein calculating the first checksum comprises initializing the first checksum using bits representative of an address of the label.

5. The method of claim 1, comprising storing the running value of the first checksum in a first register in response to the running value being calculated, updated, or accumulated for each instruction, storing a value of the second checksum in a second register, and comparing the running value of the first checksum in the first register to the value of the second checksum in the second register.

6. The method of claim 5, wherein issuing the security exception comprises issuing the security exception when the comparison of the running value of the first checksum in the first register and the second checksum in the second register indicates that the running value of the first checksum is different than the second checksum.

7. The method of claim 5, wherein storing the value of the second checksum in the second register comprises retrieving the value of the second checksum from a table comprising entries that are indexed by addresses associated with blocks of the program, wherein each entry of the table includes a second checksum calculated using bits representative of instructions in one of the blocks in the program.

8. The method of claim 1, comprising detecting and eliminating intruder code associated with the block in response to issuing the exception.

9. A method, comprising:
    generating a table comprising entries that are indexed by addresses associated with blocks of a program, wherein each entry of the table includes a checksum calculated using bits representative of instructions in the block; and
    comparing values of the entries in the table with a running value of a checksum generated by a processor-based system by modifying the running value using bits representative of each instruction concurrently with the processor-based system executing the corresponding instruction.

10. The method of claim 9, wherein generating the table comprises calculating checksums for the blocks in the program by applying a function to bits representative of instructions in the blocks, and wherein the blocks begin at a label and end with a branch instruction, and wherein comparing the values of the entries in the table with the running value comprises comparing the values of entries in the table with the running value in response to the processor-based system executing the branch instruction.

11. The method of claim 10, wherein calculating the checksums comprises calculating the checksums by applying the function to the bits representative of instructions in the block and bits representative of locations of instructions within the block.

12. The method of claim 11, wherein calculating the checksums comprises initializing the checksums using bits representative of an address of the label of the corresponding block.

13. The method of claim 9, comprising storing a value of a first checksum from the table in a first register of a processor-based system, storing a running value of a second checksum in a second register in response to the running value of the second checksum being calculated, updated, or accumulated for each instruction by the processor-based system concurrently with executing the corresponding block, and comparing the running value of the first checksum in the first register to the value of the second checksum in the second register.

14. The method of claim 13, comprising issuing a security exception when the comparison of the value of the first and the running value of the second checksum in the first and second registers indicates that the first checksum is different than the running value of the second checksum.

15. The method of claim 13, comprising storing a copy of the table on the processor-based system.

16. An apparatus, comprising:
    at least one processor for calculating a running value of a first checksum from first bits representative of each instruction in a block of a program concurrently with executing the corresponding instruction; and
    said at least one processor for issuing a security exception in response to the running value of the first checksum differing from a second checksum calculated prior to execution of the block using second bits representative of instructions in the block.

17. An apparatus as set forth in claim 16, further comprising:
    said at least one processor for generating a table comprising entries that are indexed by addresses associated with blocks of a program, wherein each entry of the table includes a checksum calculated using bits representative of instructions in the block; and
    said at least one processor for comparing values of the entries in the table with running values of checksums generated by a processor-based system concurrently with the processor-based system executing the corresponding block of the program.

18. A non-transitory computer readable storage medium encoded with instructions that, when executed by a processor-based system, cause the processor-based system to:
    calculate a running value of a first checksum from bits representative of each instruction in a block of a program concurrently with executing the corresponding instruction; and
    issue a security exception in response to the running value of the first checksum differing from a second checksum calculated prior to execution of the block using bits representative of instructions in the block.

19. A non-transitory computer readable storage medium as set forth in claim 18 encoded with instructions that, when executed by a processor-based system, cause the processor-based system to:
    generate a table comprising entries that are indexed by addresses associated with blocks of a program, wherein each entry of the table includes a checksum calculated using bits representative of instructions in the block; and
    compare values of the entries in the table with running values of checksums generated by a processor-based system concurrently with the processor-based system executing the corresponding block of the program.

20. A processor-based system, comprising:
    at least one processor configured to calculate a running value of a first checksum from bits representative of each instruction in a block of a program concurrently with executing the corresponding instruction;
    a first register for storing the running value of the first checksum; and
    a second register for storing a value of a second checksum calculated prior to execution of the block using bits representative of instructions in the block, wherein said at least one processor is configured to issue a security exception in response to the running value of the first checksum being different than the second checksum.

21. The processor-based system of claim 20, wherein said at least one processor is configured to calculate the running value of the first checksum by applying a function to bits representative of instructions in a block that begins at a label and ends with a branch instruction, and wherein said at least one processor is configured to compare the running value of the first checksum to the second checksum in response to executing the branch instruction.

22. The processor-based system of claim 21, wherein said at least one processor is configured to calculate the running value of the first checksum by applying the function to the bits representative of each instruction in the block and bits representative of a location of each instruction within the block.

23. The processor-based system of claim 22, wherein said at least one processor is configured to initialize the running value of the first checksum using bits representative of an address of the label.

24. The processor-based system of claim 20, comprising at least one memory element configured to store a table comprising entries that are indexed by addresses associated with blocks of the program, wherein each entry of the table includes a second checksum calculated using bits representative of instructions in one of the blocks in the program.

25. The processor-based system of claim 24, wherein said at least one processor is configured to the value of the second checksum from the table and store the value of the second checksum in the second register prior to executing the corresponding block.

* * * * *